United States Patent
Jeong (10) Patent No.: US 12,295,050 B2
(45) Date of Patent: May 6, 2025

(54) WIRELESS AUDIO SERVICE AUTOMATIC RESETTING METHOD AND WIRELESS AUDIO SYSTEM

(71) Applicant: LG ELECTRONICS INC., Seoul (KR)

(72) Inventor: Uk Heon Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 454 days.

(21) Appl. No.: 17/771,639

(22) PCT Filed: Nov. 26, 2019

(86) PCT No.: PCT/KR2019/016306
§ 371 (c)(1),
(2) Date: Apr. 25, 2022

(87) PCT Pub. No.: WO2021/107166
PCT Pub. Date: Jun. 3, 2021

(65) Prior Publication Data
US 2022/0369396 A1 Nov. 17, 2022

(51) Int. Cl.
*H04W 84/20* (2009.01)
*H04W 56/00* (2009.01)
(Continued)

(52) U.S. Cl.
CPC ......... *H04W 76/14* (2018.02); *H04W 56/001* (2013.01); *H04W 84/12* (2013.01); *H04W 84/20* (2013.01)

(58) Field of Classification Search
None
See application file for complete search history.

(56) References Cited

U.S. PATENT DOCUMENTS

2008/0254751 A1* 10/2008 Lazaridis .......... H04M 1/72412
455/74
2010/0015919 A1 1/2010 Tian
(Continued)

FOREIGN PATENT DOCUMENTS

| KR | 10-2011-0028056 | 3/2011 |
| KR | 10-2014-0025736 | 3/2014 |

(Continued)

OTHER PUBLICATIONS

PCT International Application No. PCT/KR2019/016306, International Search Report dated Aug. 20, 2020, 3 pages.

*Primary Examiner* — The Hy Nguyen
(74) *Attorney, Agent, or Firm* — LEE, HONG, DEGERMAN, KANG & WAIMEY (57) ABSTRACT

A wireless audio service automatic resetting method and a wireless audio system are proposed. In the wireless audio service automatic resetting method and the wireless audio system thereof that are for a slave device, the slave device requests and receives latest audio service group information from a master device by connecting to a wireless network, and performs a corresponding operation by determining whether to recover to an in-service state on the basis of the latest audio service group information. Accordingly, the slave device may be conveniently recovered to the in-service state again without user's input, thereby receiving provision of a desired audio service.

13 Claims, 6 Drawing Sheets

(51) Int. Cl.
*H04W 76/14* (2018.01)
*H04W 84/12* (2009.01)

(56) References Cited

U.S. PATENT DOCUMENTS

2014/0006587 A1* 1/2014 Kusano ............ H04N 21/41407
709/224
2018/0020497 A1* 1/2018 Shirai ................... H04W 84/18
2022/0256281 A1* 8/2022 Marash .................... H04R 1/02

FOREIGN PATENT DOCUMENTS

| KR | 10-2015-0095124 | 8/2015 |
| KR | 10-2018-0024503 | 3/2018 |
| KR | 10-1875918 | 7/2018 |

* cited by examiner

WIRELESS AUDIO SERVICE AUTOMATIC RESETTING METHOD AND WIRELESS AUDIO SYSTEM

CROSS-REFERENCE TO RELATED APPLICATIONS

This application is the National Stage filing under 35 U.S.C. 371 of International Application No. PCT/KR2019/016306, filed on Nov. 26, 2019, the contents of which is hereby incorporated by reference herein in its entirety.

TECHNICAL FIELD

The present disclosure relates to a wireless audio service automatic resetting method and a wireless audio system thereof and, more particularly, to a method of resetting a slave device in an out-of-service state to an in-service state, and a wireless audio system thereof.

BACKGROUND ART

With the rapid development of multimedia technology, even in general households, it has become possible for users to watch videos through a large-screen display device by using various multimedia sources such as a HDTV, a DVD, a mobile phone, a personal digital assistant (PDA), and a personal computer (PC), and to listen to audio having a loud and rich sound source from a slave device.

In addition, due to the recent development of wireless communication technology, wireless audio systems using a wireless network are widely used by consumers at homes or in companies. A wireless audio system may provide a multi-room audio service or a multi-channel audio service by using a plurality of slave devices. In order to use a wireless audio service, a user initially selects each slave device to set up a service group, and the slave devices that are set as a group perform the selected audio service through a selected audio source.

Meanwhile, there is a case where a slave device belonging to the wireless audio system is disconnected from a network due to a specific cause, for example, selection to push a power off button, discharge of a battery, movement of a position of the slave device, or the like, thereby resulting in an out-of-service state. In this case, there is inconvenience for the user to manually reset the slave device one by one in order to switch the corresponding slave device in the out-of-service state back to its in-service state.

DISCLOSURE

Technical Problem

An objective of the present disclosure for solving the problem is to provide a wireless audio service automatic resetting method and a wireless audio system thereof, wherein a slave device operates by automatically determining whether to switch to an in-service state. In addition, another objective of the present disclosure is to provide a wireless audio service automatic resetting method and a wireless audio system thereof, wherein in-service recovery is automatically performed by way of corresponding to a slave device function and setting a connection destination. In addition, yet another objective of the present disclosure is to provide a wireless audio service automatic resetting method and a wireless audio system thereof, wherein in-service recovery is performed quickly and automatically when power is applied to a slave device.

Technical Solution

In a wireless audio service automatic resetting method and a wireless audio system thereof according to an exemplary embodiment of the present disclosure in order to solve the problems as described above, a slave device may request and receive latest audio service group information from a master device by connecting to a wireless network, and perform a corresponding operation by determining whether to perform in-service recovery.

In addition, the slave device may be included in a latest audio service group, and the slave device may perform an operation to recover to an in-service state when a service is activated.

The slave device may check a service function (role) or a network configuration of the slave device on the basis of the latest audio service group information, and determine any one of the master device or an access point of the wireless network as a connection destination in order to recover its own service and network configuration.

When power is turned on, the slave device may connect to the access point of the wireless network on the basis of pre-stored access point information of the wireless network, request and receive the latest audio service group information, and determine whether to perform the in-service recovery. The slave device may request and receive wireless network connection information of the master device through the access point of the wireless network when a direct connection to the master device is required for service function recovery or network configuration recovery, and perform a direct network connection to the master device after disconnecting from the access point of the wireless network.

The slave device may maintain the connection to the access point of the wireless network when the connection to the access point of the wireless network is required for the service function recovery or the network configuration recovery.

The slave device may request and receive the network connection information of the master device through the access point of the wireless network, and perform a direct network connection to the master device after disconnecting from the access point of the wireless network when its own service function is a multi-channel function.

The slave device may maintain the connection to the access point of the wireless network when its own service function is a multi-room function.

In addition, the slave device may transmit a message notifying the master device that the slave device has been recovered to the in-service state, and perform time synchronization with the master device.

Here, the message notifying that the slave device has been recovered to the in-service state may include at least one of an IP address, a MAC address, and an index of the slave device.

The master device may provide information required for audio playback on the basis of the message to the slave device recovered to the in-service state, and receive and play back audio data by the slave device on the basis of the information required for the audio playback. In this case, the information required for the audio playback may include a media server address and current playback time information about an audio source, or include the audio data and playback time information.

Advantageous Effects

As described above, the wireless audio service automatic resetting method and the wireless audio system thereof according to the present disclosure may be conveniently recovered to an in-service state without user's input, thereby enabling a user to be provided with a desired audio service. In addition, a service state immediately before an out-of-service state may be quickly recovered only by applying power without user's separate reset.

MODE FOR INVENTION

Hereinafter, specific exemplary embodiments of the present disclosure will be described with reference to the drawings.

Advantages and features of the present disclosure, and a method of achieving them will become apparent with reference to the exemplary embodiments described below in detail together with the accompanying drawings. However, the present disclosure is not limited to the exemplary embodiments disclosed below, but will be implemented in a variety of different forms. These exemplary embodiments are provided only to complete the disclosure of the present disclosure and to completely inform the scope of the present disclosure to those skilled in the art to which the present disclosure pertains, and the present disclosure is only defined by the scope of the claims. Like reference numerals generally denote like elements throughout the present disclosure.

Figure 1:
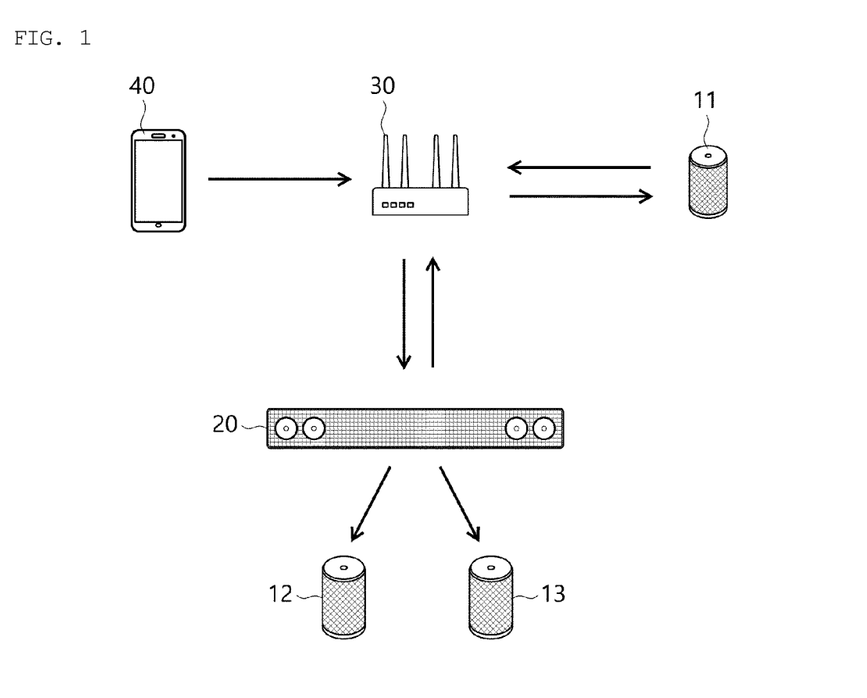
FIGS. 1 and 2 are schematic diagrams illustrating a wireless audio system according to an exemplary embodiment of the present disclosure.
Figure 2:
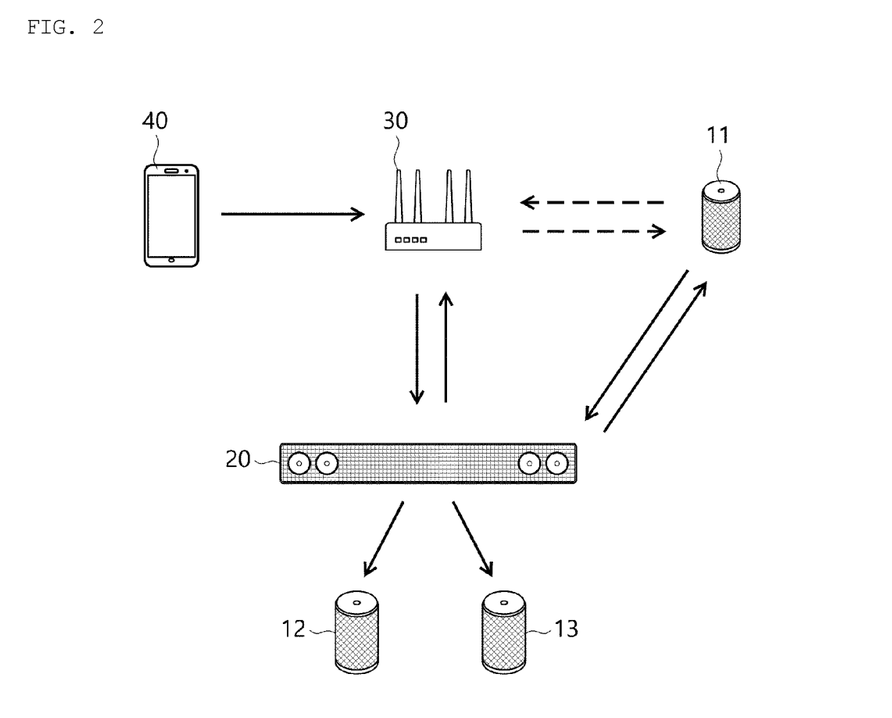

Hereinafter, a wireless audio system according to an exemplary embodiment of the present disclosure will be described with reference to FIGS. 1 and 2. FIGS. 1 and 2 are schematic diagrams illustrating the wireless audio system according to the exemplary embodiment of the present disclosure. Referring to FIGS. 1 and 2, the wireless audio system according to the present exemplary embodiment includes a plurality of slave devices 11, 12, and 13, a master device 20, a wireless access point (AP) 30, and an audio source 40. In the present exemplary embodiment, at least one slave device is included, and an example in which three slave devices 11, 12, and 13 are included will be described.

The audio source 40, the master device 20, and the slave devices 11, 12, and 13 are connected by the wireless AP 30, thereby forming a wireless network. Here, any one of various wireless communication methods such as Wi-Fi, Bluetooth, Ethernet, and near field communication (NFC) may be applied to the wireless network. In the present exemplary embodiment, an example in which the wireless audio system is configured by using Wi-Fi will be described.

The slave devices 11, 12, and 13 are connected to the wireless AP 30 or the master device 20 to receive audio playback information, and are configured to process an audio signal to output the audio signal as sound, and may be implemented by a wireless speaker, etc. Each of the slave devices 11, 12, and 13 may include: a wireless communication module for connecting to a network AP 30 or a master device 20; a signal processing module for processing audio data; and a sound output means, such as a decoder, a digital signal processor, and a speaker.

There is a case where the slave devices 11, 12, and 13 are disconnected from a network due to a specific cause, for example, selection to push a power off button, discharge of a battery, movement of a position of each slave device, or the like, thereby resulting in an out-of-service state. In this case, when the power of the slave devices 11, 12, and 13 is turned on or the network is recovered, each of the slave devices 11, 12, and 13 performs a corresponding operation by automatically determining whether to recover to an in-service state.

Specifically, the slave devices 11, 12, and 13 connect to the wireless access point 30 on the basis of pre-stored access point information of the wireless network, for example, a service set identifier (SSID) and password information, and request latest audio service group information from the master device 20 through broadcasting. Here, the latest audio service group information may include: information (e.g., an index, etc.) of a slave device included in the latest group; information of a service function (role) of the slave device, for example, information of whether a service is activated, and whether a function of the slave device is a multi-channel function or a multi-room function; information of a network configuration; and other information.

Each of the slave devices 11, 12, and 13 performs the corresponding operation by determining whether to recover to an in-service state on the basis of the received latest audio service group information. For example, when a service is currently activated while being included in the received latest audio service group, the slave devices 11, 12, and 13 perform operations to recover to the in-service state.

The master device 20 is configured to control a wireless audio service by transmitting audio playback information to the plurality of slave devices 11, 12, and 13, and may be implemented by a speaker such as a sound bar. For receiving audio data from various audio sources 40 such as a TV, a DVD, a smartphone, a personal computer (PC), a tablet PC, and the like, the master device 20 may be provided with a wired/wireless connector, for example, a High Definition Multimedia Interface (HDMI) connector, a D-sub connector, an Ethernet terminal for a connection to a wired network, etc., or a wireless network communication module, or may include a communication module for a connection to a wireless network such as Wireless LAN (WLAN, i.e., Wi-Fi), Wireless broadband (Wibro), World Interoperability for Microwave Access (Wimax), and High Speed Downlink Packet Access (HSDPA). In addition, the master device 20 may include a wireless communication module for transmitting the audio data to the slave devices 11, 12, and 13. In addition, for processing an input audio signal, the master device 20 may include an audio signal processing module, such as a decoder, an encoder, a processor, a memory, etc.

The master device 20 transmits the latest audio service group information in response to a latest audio service group information request made by the slave devices 11, 12, and 13 and received through the wireless AP 30. In addition, audio playback information and other information for service recovery is transmitted to the slave devices 11, 12, and 13 that perform recovery to the in-service state, thereby enabling the slave devices to participate in the audio service.

Figure 3:
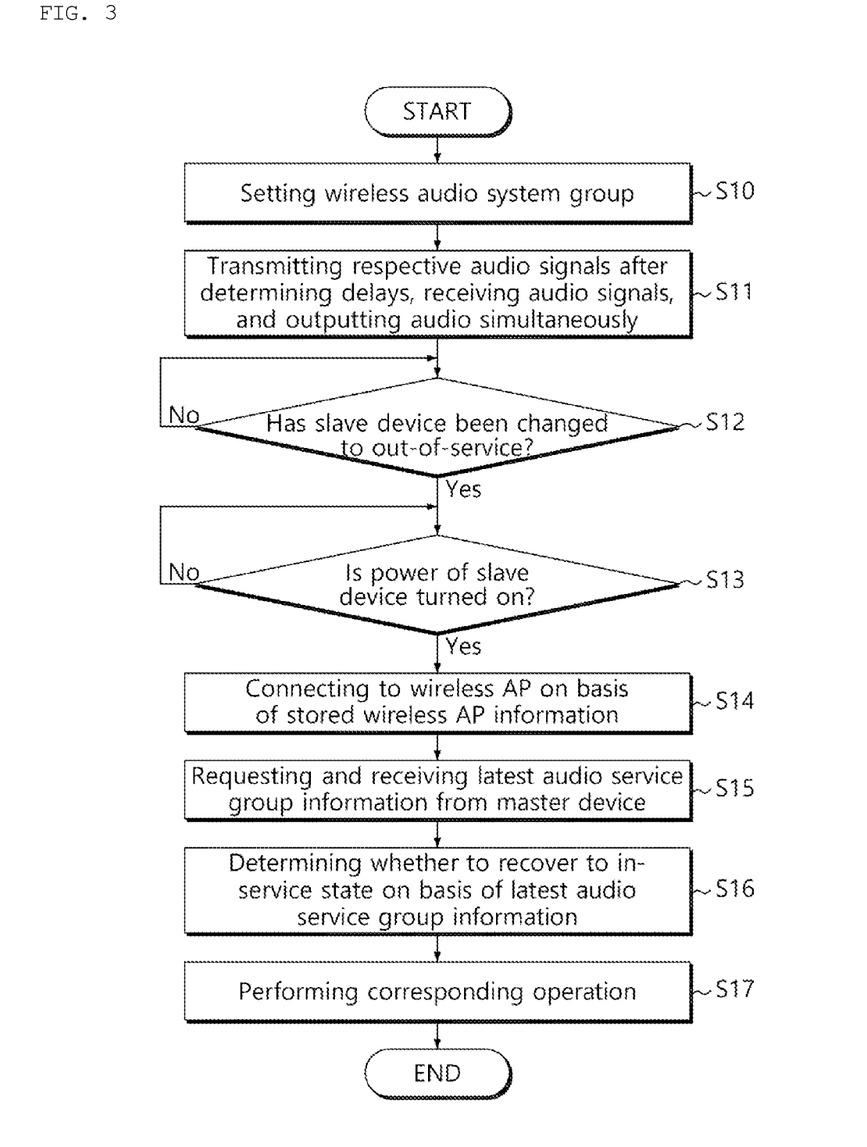
FIG. 3 is a flowchart illustrating a method of setting and automatically resetting the wireless audio system according to the exemplary embodiment of the present disclosure.

FIG. 3 is a flowchart illustrating a method of setting and automatically resetting the wireless audio system according to the exemplary embodiment of the present disclosure. Referring to FIG. 3, first, in step S10, a user sets a wireless audio system group through an app (application) and the like of a smartphone. The user may set slave devices as a group through a group setting menu, and may set a function of each slave device, for example, a function such as a master function, a slave function, a multi-channel function, a multi-room function, or the like. Through this setting process, the master device 20 and the plurality of slave devices 11, 12, and 13 is paired by a wireless network, thereby constituting the wireless audio system.

In step S11, after determining audio delays of the slave devices 11, 12, and 13, the master device 20 transmits respective audio signals to the slave devices 11, 12, and 13, which are set as the group, and the slave devices 11, 12, and 13 respectively receive and process the audio signals, and output audio simultaneously. Each audio signal may include audio playback information, for example, a synchronization signal, playback time information, audio data, and the like.

The first slave device 11 may become in an out-of-service state because a connection to the network is lost due to selection to push a power off button, discharge of a battery, or movement of a position thereof. When the first slave device 11 has gone into the out-of-service state in step S12 and then power is applied thereto in step S13, the first slave device 11 automatically connects to the wireless AP 30 on the basis of the pre-stored information of the wireless AP 30 in step S14.

In step S15, the first slave device 11 requests and receives the latest audio service group information from the master device 20 through broadcasting by the wireless AP 30. The first slave device 11 determines whether to recover to the in-service state on the basis of the received latest audio service group information in step S16, and performs a corresponding operation in step S17.

Figure 4:
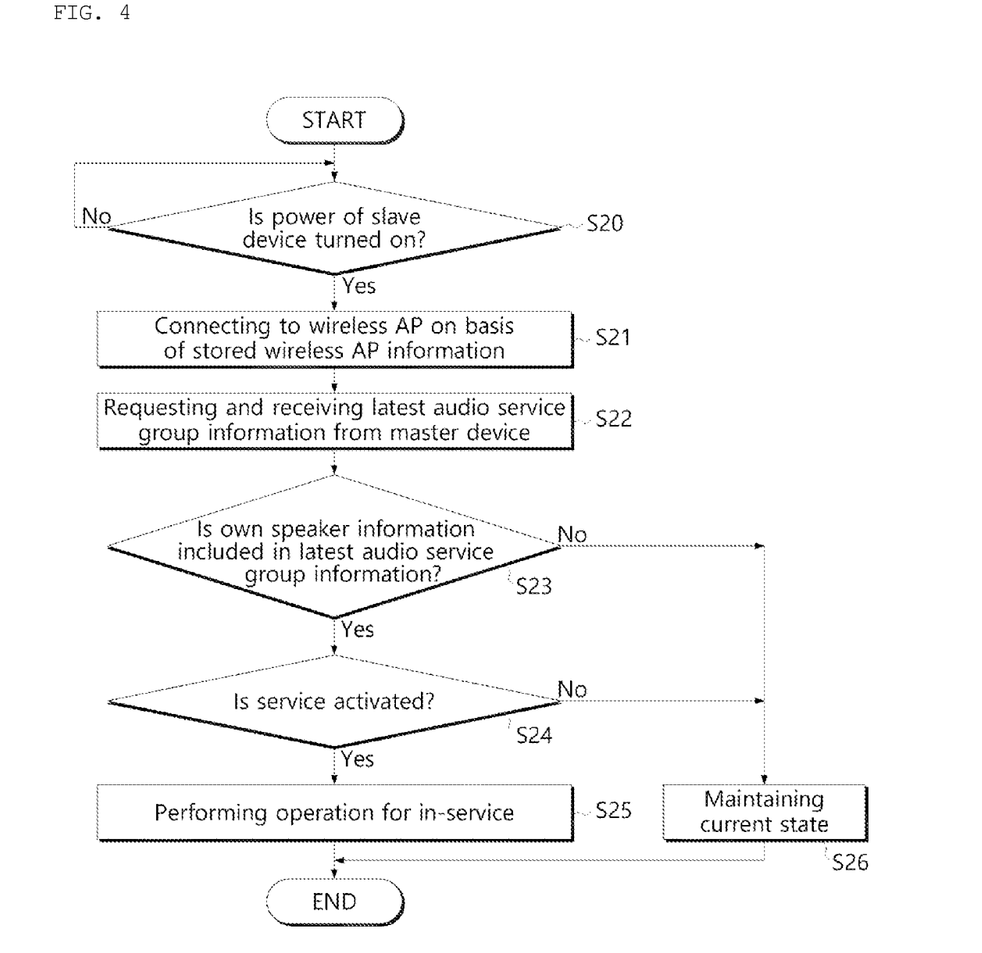
FIG. 4 is a flowchart illustrating a method of automatically resetting an audio service after power is applied in a slave device according to the exemplary embodiment of the present disclosure.

FIG. 4 is a flowchart illustrating a method of automatically resetting an audio service after power is applied in the first slave device 11 according to the exemplary embodiment of the present disclosure.

When the power is applied to the first slave device 11 in step S20, the first slave device 11 automatically connects to the wireless AP 30 on the basis of the pre-stored information of the wireless AP 30 in step S21. In step S22, the first slave device 11 requests and receives the latest audio service group information from the master device 20 through broadcasting by the wireless AP 30.

The first slave device 11 checks whether the first slave device 11 itself is included in the latest audio service group on the basis of the latest audio service group information in step S23, and when the first slave device 11 itself is included in the latest audio service group, the first slave device 11 determines whether the group service is currently activated or not in step S24.

When the first slave device 11 is included in the latest audio service group and the service is currently activated, the first slave device 11 performs an operation to recover to the in-service state in step S25. When the first slave device 11 is not included in the latest audio service group or when the service is not activated even though the first slave device 11 is included in the latest audio service group, the first slave device 11 maintains the current state in step S26.

In this case, the recovery to the in-service state of the first slave device 11 includes recovery to the service and network configuration at a time immediately before the out-of-service state. Accordingly, in the service and network configuration at the time immediately before the out-of-service state, the method of performing recovery to the in-service state may vary depending on whether the first slave device 11 is connected to the master device 20 through the wireless AP 30 or is directly connected to the master device 20.

In addition to information of the slave device included in the latest group, the latest audio service group information includes the information on the function (role) of the slave device, for example, the information including whether the function is a multi-channel function or a multi-room function, a network configuration, etc., so the first slave device 11 checks the latest audio service group information received from the master device 20 and determines whether a direct connection to the master device 20 or a connection to the wireless AP 30 is required for recovery of its own service function, thereby determining a network connection destination for the in-service recovery.

In general, in a case of performing the multi-channel function, the first slave device 11 is directly connected to the master device, and in a case of performing the multi-room function, the first slave device 11 is connected to the wireless AP 30.

Figure 5:
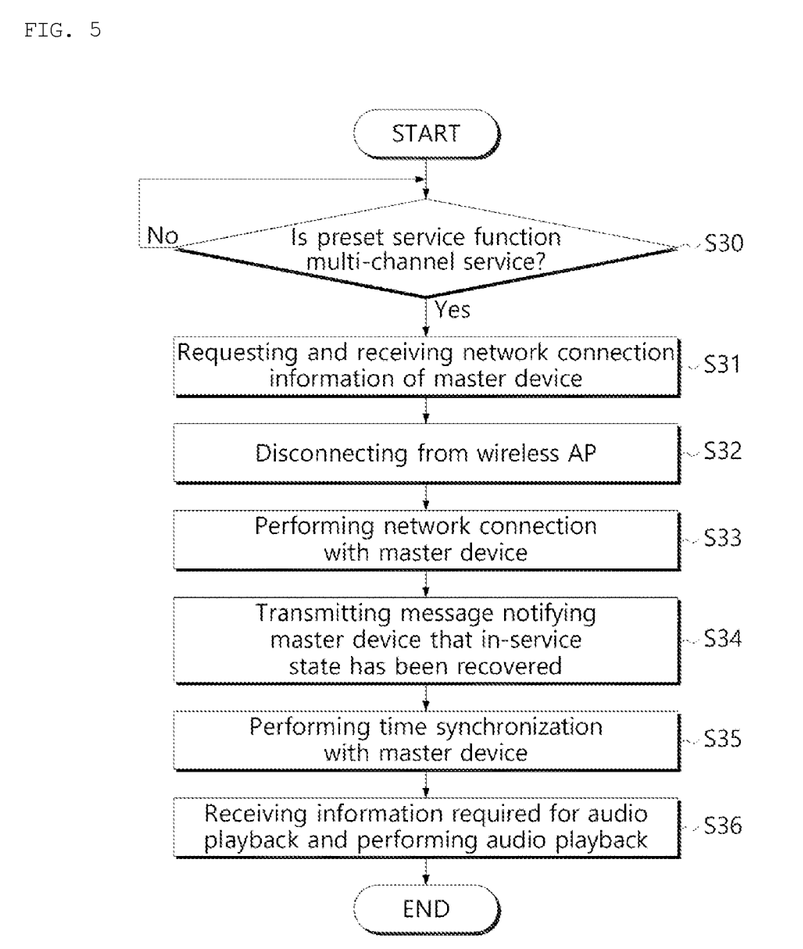
FIG. 5 is a flowchart illustrating a method of recovering a multi-channel service of the slave device according to the exemplary embodiment of the present disclosure.

The method for in-service recovery of the first slave device 11, which is directly connected to the master device 20 and performs the multi-channel function, will be described with reference to FIGS. 1 and 5. FIG. 5 is a flowchart illustrating a method of recovering a multi-channel service according to the exemplary embodiment of the present disclosure.

The first slave device 11 checks a service function on the basis of the latest audio service group information, and when its own service of the first slave device 11 is confirmed to be the multi-channel function in step S30, the first slave device 11 determines a connection destination as the master device 20, and performs an operation for the direct connection to the master device 20.

Specifically, in step S31, through the currently connected wireless AP 30, the first slave device 11 requests and receives the network connection information of the master device 20 from the master device 20. For network-connected devices, the master device 20 may operate in a station mode and a soft AP mode that operates like an access point (AP). The first slave device 11 performing a multi-channel service operates in the soft AP mode. The master device 20 transmits the network connection information of its own soft AP, for example, information on service set identifier (SSID) and a password, in response to a request of the first slave device 11.

The first slave device 11 disconnects from the previously connected wireless AP 30 in step S32, and performs a direct connection to the master device 20 on the basis of the received soft AP connection information of the master device 20 in step S33.

In step S34, the first slave device 11 transmits a message notifying the connected master device 20 that the first slave device 11 itself has been recovered to the in-service state. The message that notifies the service recovery may include an IP address, a MAC address, an index, or the like of the first slave device 11. Since the IP address assigned by the network AP 30 may be changed, the message, notifying the recovery to the in-service state of the first slave device 11, should include the IP address of the slave device, and in this way, the master device 20 may check the in-service slave devices in the group and transmit audio playback information.

In step S35, the first slave device 11 performs time synchronization with the master device 20 so that the same music may be played back at the same time. In addition, the master device 20 transmits information required for the audio playback, and on the basis of the transmitted information, the first slave device 11 receives and processes the audio data, so as to play back the audio data as audio in step S36.

The information required for audio playback includes a media server address and current playback time information about the audio source 40 when the audio streaming method is a pull method. The media server address is required for downloading audio data, and the current playback time is used in order that an audio part that has already passed is discarded without playing back the part. When the audio streaming method is a push method, the information required for the audio playback may include the audio data and information of the audio playback time.

Figure 6:
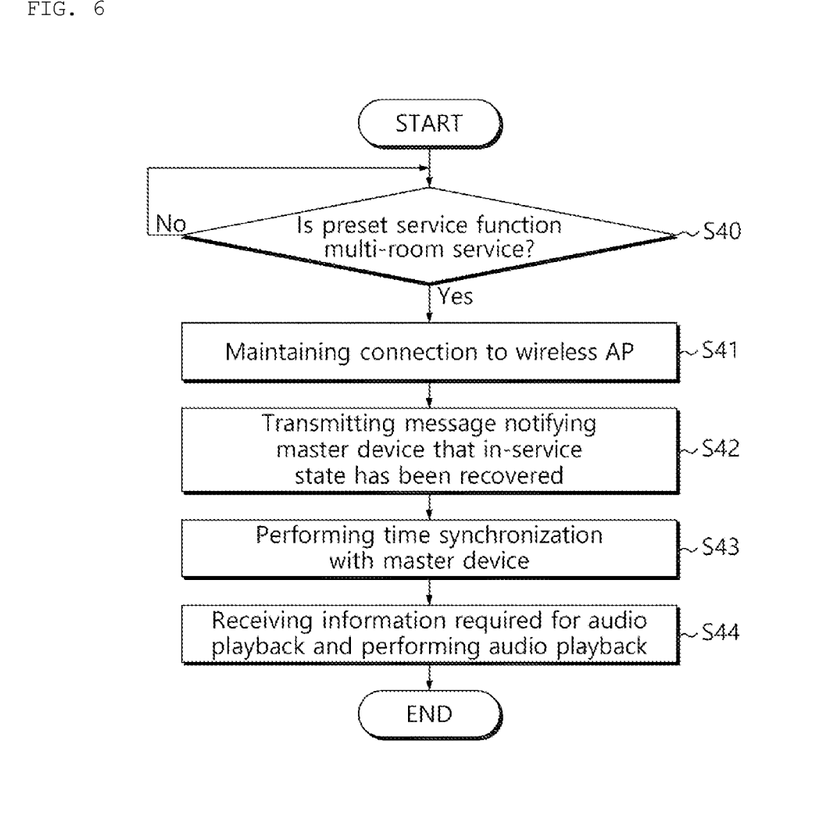
FIG. 6 is a flowchart illustrating a method of recovering a multi-room service of the slave device according to the exemplary embodiment of the present disclosure.

A method of the in-service recovery of the first slave device 11, which is connected to the wireless AP 30 and performs the multi-room function, will be described with reference to FIGS. 2 and 6. FIG. 6 is a flowchart illustrating a method of recovering a multi-room service according to the exemplary embodiment of the present disclosure. A description that overlaps with the above-described exemplary embodiment will be omitted.

The first slave device 11 checks a service function on the basis of latest audio service group information, and when it is confirmed that its own service of the first slave device 11 is the multi-room function in step S40, the first slave device 11 determines a connection destination as the wireless AP 30, and maintains the connection to the wireless AP 30 in step S41.

In step S42, the first slave device 11 transmits a message notifying that the first slave device 11 itself has been recovered to the in-service state to the master device 20 through the wireless AP 30. In step S43, the first slave device 11 performs time synchronization with the master device 20 so that the same music may be played back at the same time. In addition, the master device 20 transmits information required for the audio playback, and on the basis of the transmitted information, the first slave device 11 receives and processes the audio data, so as to play back the audio data as audio in step S44.

In the above-described exemplary embodiment, it is described as an example that the slave device is directly connected to the master device 20 in the case of the multi-channel service, and is connected to the wireless AP 30 in the case of the multi-room service, but it is natural that a different type of network configuration may be provided. The first slave device 11 to which power is applied in the out-of-service state determines the connection destination for recovering the network configuration and service function at the time immediately before the out-of-service state, and depending on whether the corresponding connection destination is the wireless AP 30 or the master device 20, the operations in FIGS. 5 and 6 may be performed, respectively.

Therefore, steps S31 to S36 in FIG. 5 may be performed when the first slave device 11 requires the connection to the master device 20 for its own service recovery, and steps S41 to S44 in FIG. 6 may be performed when the first slave device 11 requires the connection to the wireless AP 30 for its own service recovery. Accordingly, the respective service recovery of FIGS. 5 and 6 is not limited to the multi-channel function and the multi-room function.

Meanwhile, the operating method of the slave device of the present disclosure may be implemented as codes readable by a processor or a controller on a recording medium readable by the processor or controller provided in the slave device. The recording medium readable by the processor or controller includes all types of recording devices in which data readable by the processor or controller is stored. Examples of the recording medium readable by the processor or controller include a ROM, a RAM, a CD-ROM, a magnetic tape, a floppy disk, an optical data storage device, and the like, and also includes those implemented in the form of carrier waves such as transmission over the Internet. In addition, the processor-readable recording medium is distributed in a computer system connected to a network, so that the processor-readable code may be stored and executed in a distributed method.

In addition, in the above, the preferred exemplary embodiments of the present disclosure have been illustrated and described, but the present disclosure is not limited to the specific exemplary embodiments described above. In the present disclosure, various modifications may be possible by those skilled in the art to which the present disclosure belongs without departing from the spirit of the present disclosure claimed in the claims, and these modifications should not be understood individually from the technical ideas or prospect of the present disclosure.

What is claimed is:

1. A wireless audio service automatic resetting method, the method comprising:
   requesting and receiving, by a slave device, latest audio service group information from a master device by connecting to a wireless network;
   performing, by the slave device, a corresponding operation by determining whether to recover to an in-service state based on the latest audio service group information,
   wherein performing the corresponding operation by determining whether to recover to the in-service state comprises:
      checking whether the slave device is comprised in a latest audio service group and whether a service is currently activated; and
      performing an operation to recover to the in-service state by the slave device in response to the slave device being comprised in the latest audio service group and the service being currently activated,
   wherein performing the operation to recover to the in-service state by the slave device comprises:
      checking a service function of the slave device by the slave device based on the latest audio service group information;
      requesting and receiving wireless network connection information of the master device through an access point of the wireless network by the slave device in response to a direct connection to the master device being required for the service function;
      performing a direct wireless network connection to the master device by the slave device based on the wireless network connection information of the master device after disconnecting from the access point of the wireless network;

transmitting a message notifying the master device that the slave device has been recovered to the in-service state,
wherein the message comprises at least one of an IP address, a MAC address, and an index of the slave device; and
performing time synchronization with the master device; and
providing, by the master device, information required for audio playback based on the message to the slave device recovered to the in-service state; and
receiving and playing back audio data by the slave device based on the information required for the audio playback.

2. The method of claim 1, wherein requesting and receiving the latest audio service group information comprises:
connecting to the wireless network based on previously stored access point information in response to power of the slave device being turned on.

3. The method of claim 1, wherein performing the operation to recover to the in-service state by the slave device further comprises:
maintaining a connection to the access point of the wireless network in response to the connection to the access point of the wireless network being required for the service function.

4. The method of claim 1, wherein performing the operation to recover to the in-service state by the slave device further comprises:
requesting and receiving the wireless network connection information of the master device through the access point of the wireless network and performing the direct wireless network connection to the master device based on the wireless network connection information of the master device after disconnecting from the access point of the wireless network, by the slave device in response to the service function being a multi-channel function, and maintaining a connection to the access point of the wireless network by the slave device in response to the service function being a multi-room function.

5. The method of claim 1, wherein the information required for the audio playback comprises:
a media server address and current playback time information about an audio source.

6. The method of claim 5, wherein the information required for the audio playback further comprises:
the audio data and playback time information.

7. A wireless audio system comprising:
a slave device configured to request latest audio service group information from a wireless master device by connecting to a wireless network, and perform a corresponding operation by determining whether to recover to an in-service state on the basis of based on the latest audio service group information; and
a master device configured to transmit the latest audio service group information to the slave device through an access point of the wireless network in response to a request from the slave device,
wherein the slave device is further configured to perform an operation to recover to the in-service state in response to the slave device being comprised in the latest audio service group and a service being activated,
wherein the slave device is further configured to check a service function of the slave device itself based on the latest audio service group information,
wherein, in response to the service function requiring a direct connection to the master device, the slave device is further configured to request wireless network connection information of the master device through the access point of the wireless network and perform direct network connection to the master device based on the network connection information of the master device after disconnecting from the access point of the wireless network, and
wherein, in response to the service function requiring a connection to the access point of the wireless network, the slave device is further configured to maintain the connection to the access point of the wireless network.

8. The wireless audio system of claim 7,
wherein, in response to the service function being a multi-channel function, the slave device is further configured to request and receive the wireless network connection information of the master device through the access point of the wireless network and perform direct wireless network connection to the master device based on the wireless network connection information of the master device after disconnecting from the access point of the wireless network, and
wherein, in response to the service function being a multi-room function, the slave device is further configured to maintain the connection to the access point of the wireless network.

9. The wireless audio system of claim 7, wherein the slave device is further configured to transmit a message notifying the master device that the slave device itself has been recovered to the in-service state and perform time synchronization with the master device.

10. The wireless audio system of claim 9, wherein the master device is further configured to provide information required for audio playback to the slave device participating in a wireless audio service based on the message, and
wherein the slave device is further configured to receive and play back audio data based on the information required for the audio playback.

11. A wireless audio system comprising:
a slave device configured to request latest audio service group information from a wireless master device by connecting to a wireless network, and perform a corresponding operation by determining whether to recover to an in-service state based on the latest audio service group information; and
a master device configured to transmit the latest audio service group information to the slave device through an access point of the wireless network in response to a request from the slave device,
wherein the slave device is further configured to perform an operation to recover to the in-service state in response to the slave device being comprised in the latest audio service group and a service being activated,
wherein the slave device is further configured to check a service function of the slave device based on the latest audio service group information,
wherein, in response to the service function being a multi-channel function, the slave device is further configured to request and receive the wireless network connection information of the master device through the access point of the wireless network and perform direct wireless network connection to the master device based on the wireless network connection information of the master device after disconnecting from the access point of the wireless network, wherein, in response to the service function being a multi-room function, the slave device is further configured to maintain the connection to the access point of the wireless network, and wherein the slave device is further configured to transmit a message notifying the master device that the slave device itself has been recovered to the in-service state and perform time synchronization with the master device.

12. The wireless audio system of claim 11, wherein the slave device is further configured to transmit a message notifying the master device that the slave device itself has been recovered to the in-service state and perform time synchronization with the master device.

13. The wireless audio system of claim 12, wherein the master device is further configured to provide information required for audio playback to the slave device participating in a wireless audio service based on the message, and wherein the slave device is further configured to receive and play back audio data based on the information required for the audio playback.

\* \* \* \* \*